United States Patent [19]

Sakamoto

[11] Patent Number: 4,808,901
[45] Date of Patent: Feb. 28, 1989

[54] CONTROL APPARATUS FOR LINEAR MOTOR

[75] Inventor: Takao Sakamoto, Shizuoka, Japan

[73] Assignee: Tokyo Electric Co., Ltd., Tokyo, Japan

[21] Appl. No.: 132,423

[22] Filed: Dec. 14, 1987

[30] Foreign Application Priority Data

Dec. 19, 1986 [JP] Japan .................. 61-304979

[51] Int. Cl.$^4$ ............................................. G05B 11/00
[52] U.S. Cl. ................... 318/687; 318/135; 318/561
[58] Field of Search ............. 318/561, 687, 135, 640

[56] References Cited

U.S. PATENT DOCUMENTS

| | | | |
|---|---|---|---|
| 4,368,413 | 1/1983 | Tazaki | 318/687 |
| 4,437,047 | 3/1984 | Smay | 318/649 |
| 4,587,472 | 5/1986 | Steinmetz et al. | 318/687 |
| 4,724,370 | 2/1988 | Moraru et al. | 318/687 X |

FOREIGN PATENT DOCUMENTS

| | | |
|---|---|---|
| 5074112 | 11/1973 | Japan . |
| 55-34716 | 3/1980 | Japan . |
| 60-134793 | 7/1985 | Japan . |
| 60-213286 | 10/1985 | Japan . |
| 61-222035 | 10/1986 | Japan . |

OTHER PUBLICATIONS

Magnetoresistive Skin for Robots by J. M. Vranish.
The Constraints on the Design and Use of Silicon–Diaphragm Pressure Sensors by J. H. Greenwood.

Primary Examiner—Benjamin Dobeck
Attorney, Agent, or Firm—Frishauf, Holtz, Goodman & Woodward

[57] ABSTRACT

A control apparatus for a linear motor includes a linear motor having a moving coil to be moved in response to a drive signal, a position detector for generating a present position signal representing a present position of the moving coil, a target position setter for generating a target position signal representing a target position of the moving coil, a position deviation detector for generating a position deviation signal representing a difference between the target position signal and the present position signal, an inclination angle detector for generating an inclination angle signal representing an angle between a moving direction of the moving coil and a horizontal plane of the earth, a control instruction circuit for amplifying the position deviation signal with characteristics corresponding to the magnitude of the inclination angle signal, and for generating a control instruction signal, and a driver circuit for generating the drive signal corresponding to the control instruction signal.

28 Claims, 10 Drawing Sheets

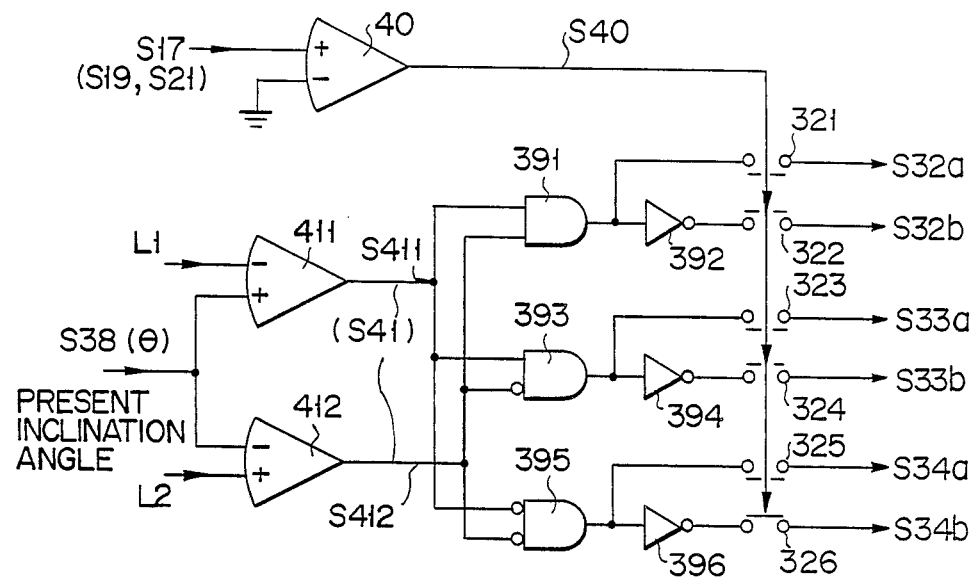
FIG. 10
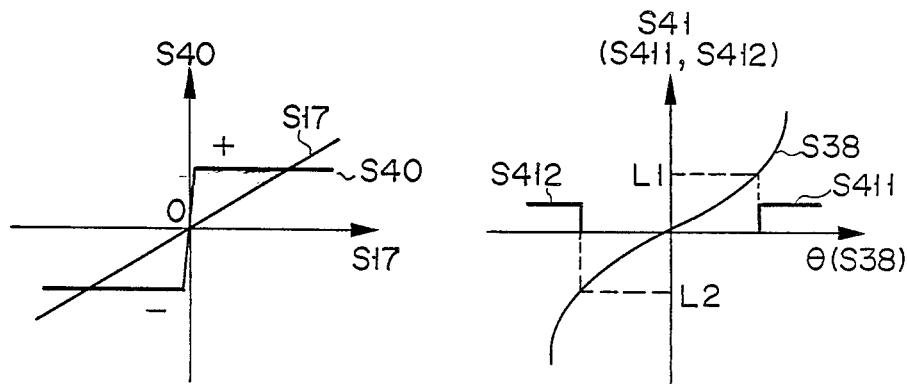
FIG. 11
FIG. 12

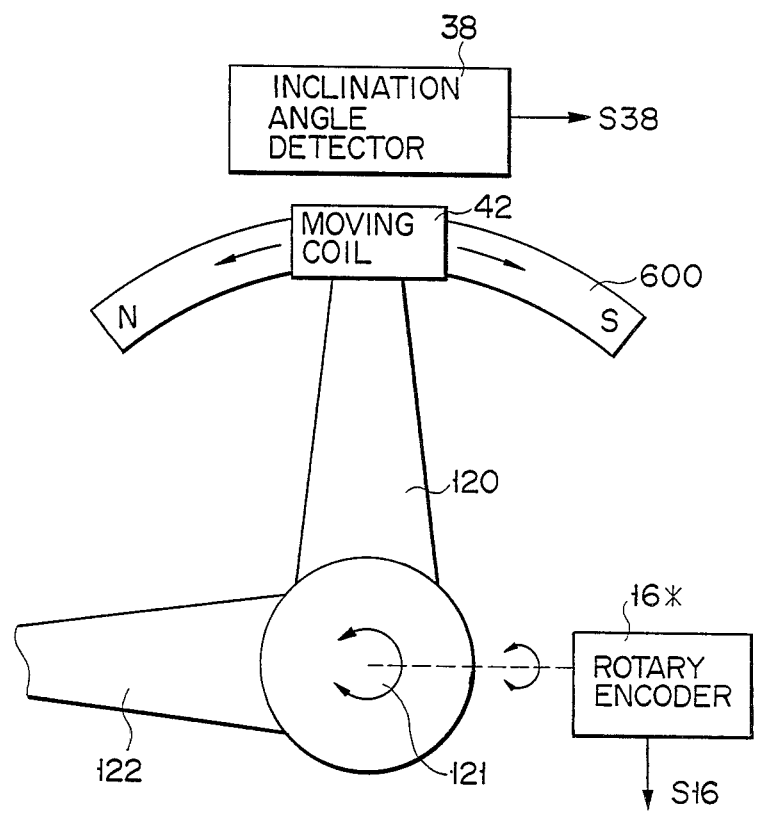
F I G. 14

CONTROL APPARATUS FOR LINEAR MOTOR

BACKGROUND OF THE INVENTION

The present invention relates to a control apparatus for a linear motor suitable for use in optical head access or the like in an optical disk drive unit.

A conventional high-precision positioning control apparatus for a linear motor is described in Japanese Patent Disclosure (Kokai) No. 60-134793. The summary of this conventional apparatus will be described with reference to FIG. 4. A target position signal is input to the positive input of adder 3 and its negative input receives a present position signal from position detector 2. The present position signal is used to detect a present position of a moving piece of linear motor 1. Adder 3 calculates a position deviation. The position deviation signal output from adder 3 is input to the positive input of adder 5, and its negative input receives a speed feedback signal. The speed feedback signal is obtained from speed detector 4 for detecting the present speed of the moving piece of linear motor 1. Adder 5 calculates a deviation between the input signals, and its output is amplified with a gain K1 or K2 by amplifier 6 or 7. Amplifier 6 or 7 is selected by switch 9 controlled in response to an output from speed level detector 8. The signal from selected amplifier 6 or 7 is input to driver circuit 10 for linear motor 1. Linear motor 1 is controlled on the basis of the output signal from driver circuit 10, such that the moving piece of motor 1 reaches the target position.

In the conventional apparatus described above, the gain (K1, K2) is switched only by the result obtained by detecting the present speed level. Then, an abrupt change occurs in movement of linear motor 1 upon gain switching. For example, in an optical pickup linear motor in a CD player for vehicle mounting, when the linear motor is inclined with respect to the earth, a gravity component adversely affects the thrust of the linear motor. As a result, when the inclination angle of the linear motor with respect to the earth is increased, the position etc., of the moving piece of the linear motor cannot be often controlled.

SUMMARY OF THE INVENTION

It is accordingly an object of the present invention to provide a control apparatus for a linear motor, which can normally control the linear motor even if the linear motor is inclined with respect to the earth.

To achieve the above object of the present invention, there is provided a control apparatus for a linear motor, which includes a linear motor having a moving piece to be moved in response to a drive signal, a position detector for generating a present position signal representing a present position of the moving piece, a target position setter for generating a target position signal representing a target position of the moving piece, a position deviation detector for generating a position deviation signal representing a difference between the target position signal and the present position signal, an inclination angle detector for generating an inclination angle signal representing an angle between a moving direction of the moving piece and a horizontal plane of the earth, a control instruction circuit for modifying the position deviation signal in accordance with characteristics corresponding to a magnitude of the inclination angle signal and generating a control instruction signal, and a driver circuit for generating the drive signal corresponding to the control instruction signal.

Control is performed depending on position data of the moving piece as well as the inclination angle between the moving direction of the moving piece of the linear motor and the horizontal plane of the earth. According to the control method depending on the inclination angle of the moving piece as well, control can be performed even if the linear motor is inclined, as compared with a control method depending on only the position of the moving piece, with a control method depending on the position and speed of the moving piece, or with a control method depending on the position, the speed, and the acceleration speed of the moving piece. Linear motor access speed and precision can therefore be improved. In other words, the moving piece can be controlled on the basis of the target value regardless of the condition of the linear motor. In addition, a transfer function in a motor control loop is adjusted in accordance with a deviation level between the moving piece position and its target position, and the present inclination angle level. Position information and the like of the moving piece can be variably weighted, and control, being free of distubance such as vibration or swinging, can thus be achieved.

BRIEF DESCRIPTION OF THE DRAWINGS

FIG. 10 is a block diagram showing a detailed arrangement of a condition control circuit and a decoder in FIG. 1;

FIG. 11 is a graph showing the input vs. output characteristic of comparator 40 in FIG. 10;

FIG. 12 is a graph showing input vs. output characteristic of comparators 411 and 412 in FIG. 10;

FIG. 14 is a view showing a motor arrangement as a modification of FIG. 5, in which moving piece 42 is moved along a locus having a predetermined curvature.

DETAILED DESCRIPTION OF THE PREFERRED EMBODIMENTS

Figure 1:
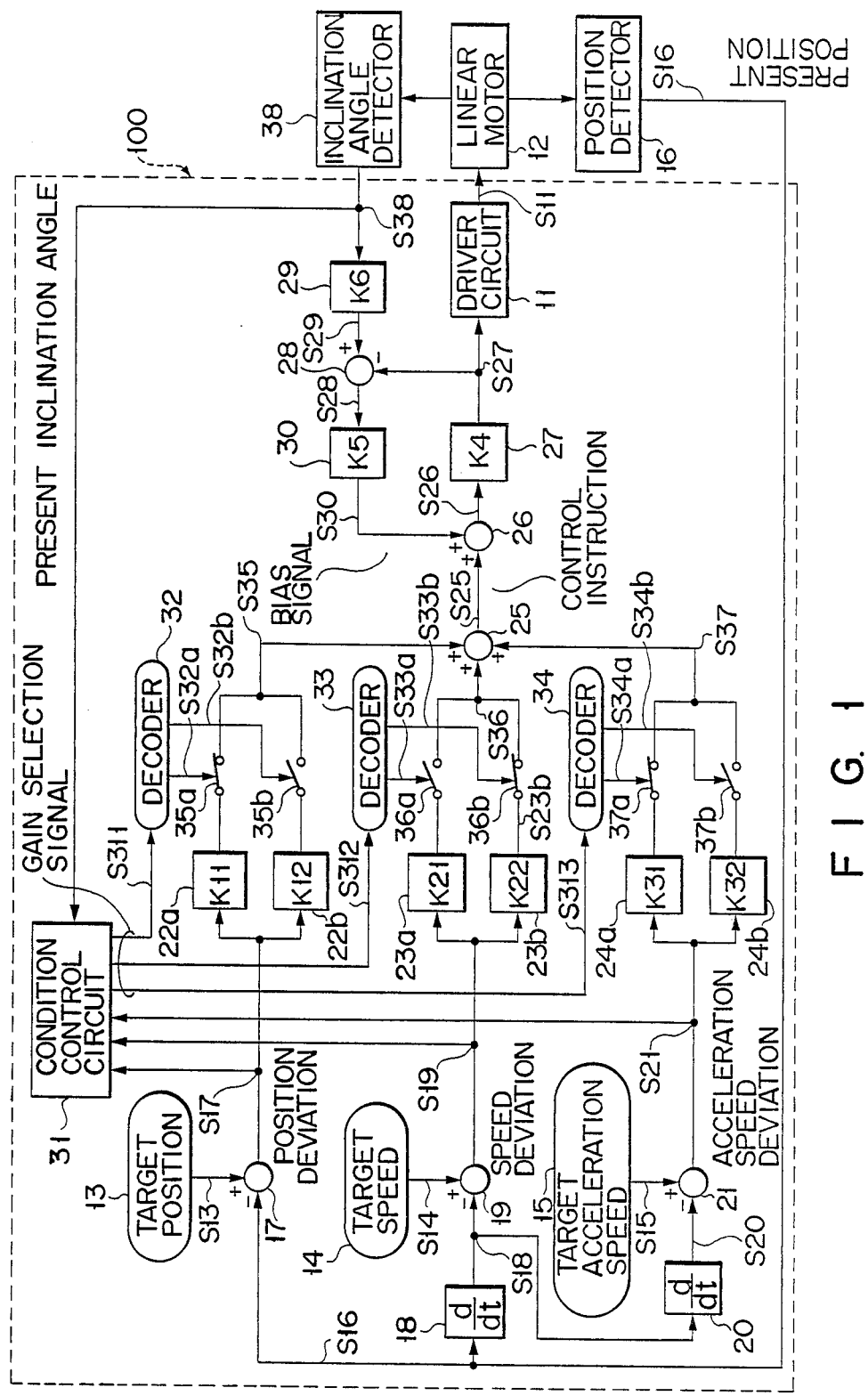
FIG. 1 is a block diagram showing an arrangement of a control apparatus for a linear motor according to an embodiment of the present invention.

An embodiment of the present invention will be described with reference to FIGS. 1 to 3.

Linear motor 12 as an object to be controlled is driven by driver circuit 11. A target position (S13), a target speed (S14), and a target acceleration speed (S15) are set by setters 13, 14, and 15, respectively. Position detector 16 is arranged on linear motor 12 to detect a present position of its moving piece. Position detector 16 can be a mechanical, electrical, magnetic, or optical means and may be replaced by any other means for converting the position of the moving piece in linear motor 12 into an electrical signal (S16). Typical position detector 16 is a potentiometer ganged with the moving piece in linear motor 12. Present position signal S16 from position detector 16 is supplied to the negative input of adder 17, and target position signal S13 set by setter 13 is input to the positive input of adder 17. Adder 17 calculates position deviation S17.

Present position signal S16 is also input to differentiator 18. Differentiator 18 differentiates signal S16 with respect to time, and outputs present speed signal S18. Present speed signal S18 is input to the negative input of adder 19, and the positive input of adder 19 receives target speed signal S14 set by setter 14. Adder 19 calculates speed deviation S19.

Present speed signal S18 output from differentiator 18 is also input to another differentiator 20. Signal S18 is differentiated with respect to time, and differentiator 20 generates present acceleration speed signal S20. Signal S20 is input to the negative input of adder 21, and the positive input of adder 21 receives target acceleration speed signal S15 set by setter 15. Adder 21 calculates an acceleration speed deviation.

Inclination angle detector 38 is mounted on linear motor 12 to detect a present inclination angle ($\theta$) of the moving plane of the linear motor moving piece with respect to the horizontal plane of the earth (this detection will be described later with reference to FIGS. 6 to 9).

Present values, including the present position (S16), the present speed (S18), the present acceleration speed (S20), and the present inclination angle (S38), are detected in this manner. Of these present values, the position, speed, and acceleration speed are compared with the corresponding target values (S13–S15), and position, speed, and acceleration speed deviations (S17, S19, and S21) are calculated. Calculated position deviation S17, calculated speed deviation S19, and calculated acceleration speed deviation S21 are input to amplifiers 22, 23, and 24, respectively, and are amplified with gains K1, K2, and K3, respectively. The deviations amplified by amplifiers 22, 23, and 24 are input to and added by adder 25 in the following manner:

$$K1 \cdot (\text{Position deviation S17}) + K2 \cdot (\text{speed deviation S19}) + K3 \cdot (\text{Acceleration Speed deviation S21}) \quad (1)$$

An output signal or a calculation result of adder 25 is obtained as control instruction signal S25.

Control instruction signal S25 is input together with bias signal S30 to adder 26, and output signal S26 from adder 26 is amplified with gain K4 by amplifier 27. Output signal S27 from amplifier 27 is input to driver circuit 11 and the negative input of adder 28.

Present inclination angle $\theta$ (S38) detected by inclination angle detector 38 is amplified with gain K6 by amplifier 29 and serves as bias amount S29. Bias amount S29 is input to the positive input of adder 28, and the negative input of adder 28 receives driver circuit input signal S27. Deviation S28 between signals S27 and S29 is calculated by adder 28. Deviation S28 is multiplied with coefficient K5, smaller than 1, by multiplier 30. The product signal, i.e., bias signal S30, is input to adder 26. In other words, bias signal S30 serves as a feed back signal of a closed loop of elements 26, 27, 11, 12, 38, 29, 28, and 30.

Linear motor 12 is controlled and driven to achieve target values S13 to S15, on the basis of control instruction signal S25 sent to driver circuit 11. Linear motor 12 is controlled by driver circuit 11 such that control instruction signal S25 is converged to zero.

Amplifiers 22, 23, and 24 detect levels of deviations S17, S19, and S21 respectively input to amplifiers 22, 23, and 24, and the gains of these amplifiers are controlled to be based on the detected levels of the deviations. Amplifiers 22, 23, and 24 are constituted by two amplifiers 22a and 22b, two amplifiers 23a and 23b, and two amplifiers 24a and 24b, respectively (each amplifier may be constituted by three or more amplifiers). Gains of amplifiers 22a, 22b, 23a, 23b, 24a, and 24b are denoted by K11, K12, K21, K22, K31, and K32, respectively.

Position deviation S17, speed deviation S19, acceleration speed deviation S21 from adders 17, 19 and 21, and present inclination angle signal S38 from inclination angle detector 38, are also input to condition control circuit 31. Condition control circuit 31 performs level detection on the basis of deviations S17, S19, and S21 and present inclination angle S38, and outputs gain selection signals S311 to S313 for amplifiers 22a, 22b, 23a, 23b, 24a, and 24b.

Gain selection signals S311 to S313 are input to decoders 32, 33, and 34. Decoders 32, 33, and 34 control the opening/closing conditions of analog switches 35, 36 and 37 in response to gain selection signals S311 to S313. For example, decoder 32 controls to close analog switch 35a connected to amplifier 22a, or to close analog switch 35b connected to amplifier 22b, in response to position gain selection signal S311. Amplifier 22a or 22b is selected so that the position gain is set to be K11 or K12. The same selection operations as described above are performed in speed and acceleration speed control.

Figure 2:
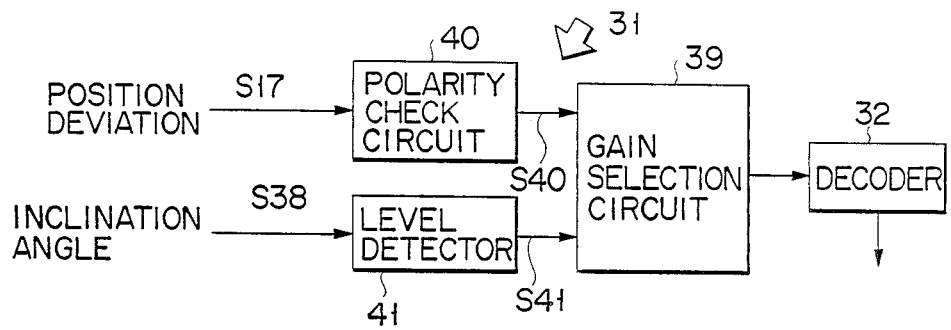
FIG. 2 is a block diagram showing an internal arrangement of a condition control cirucit shown in FIG. 1.

Condition control circuit 31 includes gain selection circuit 39 shown in FIG. 2. The polarity of position deviation S17 is checked by polarity check circuit 40, and the resultant position deviation is input to gain selection circuit 39. The level of present inclination angle S38 is detected by level detector 41, and the level-detected inclination angle is input to gain selection circuit 39. An output from gain selection circuit 39 is sent to, e.g., the analog switch, via decoder 32.

Figures 3A, 3B, 3C:
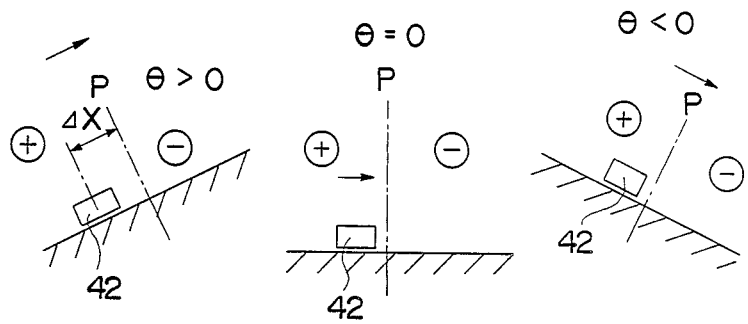
FIGS. 3A to 3C are views for explaining control operations when moving piece 42 in the linear motor is inclined counterclockwise, kept horizontal, and inclined clockwise with respect to the earth, respectively.
Figure 4:
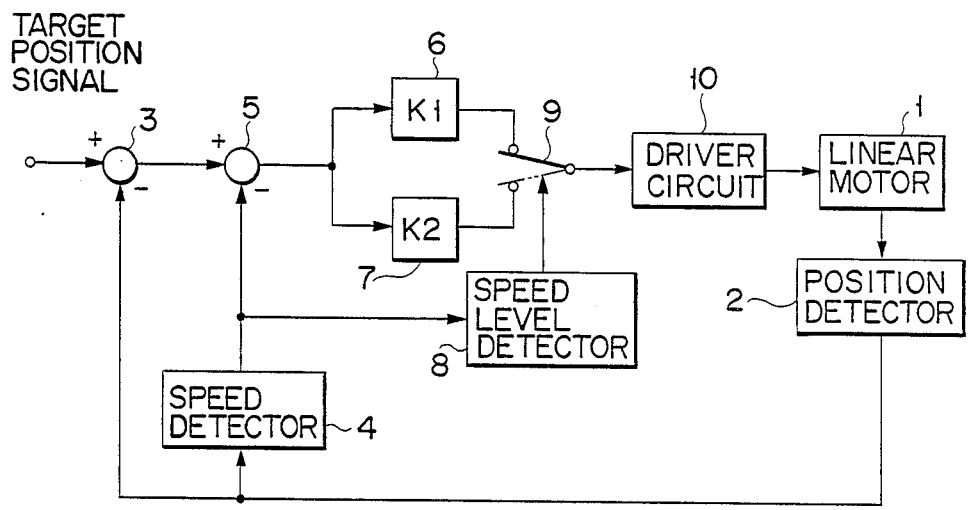
FIG. 4 is a block diagram showing an arrangement of a conventional control apparatus for a linear motor.

The operation of gain selection circuit 39 will be described below. When inclination conditions along the moving direction of linear motor 12 are taken into consideration, one of the conditions in FIGS. 3A to 3C is taken. An arrow in each figure indicates the moving direction of linear motor moving piece 42. The inclination state represents an ascending condition, a horizontal condition, or a descending condition. The positive or negative (+ or −) sign of the position of moving piece 42 in the linear motor with respect to target position P of linear motor 12 is checked by polarity check circuit 40.

Level detector 40 detects an ascending condition (FIG. 3A), a horizontal condition (FIG. 3B), or a descending condition (FIG. 3C). Gains of amplifiers 22 to 24 are selected in accordance with the detected condition.

Here, gains K11 and K12 of amplifiers 22a and 22b are considered. Assume that condition K11γ K12 is established. In this case, when linear motor moving piece 42 is located below target position P (i.e., the condition is given as shown in FIG. 3A), a gravity component acts on moving piece 42 in a direction opposite to position P. Therefore, amplifier 22b having the larger gain K12 is selected.

When linear motor moving piece 42 has passed target position P and is located above target position P, moving piece 42 must be returned along the descending slope toward target position P. In this case, a gravity component acts on moving piece 42 in a direction towarding target position P, and amplifier 22a having smaller gain K11 is selected.

When the horizontal condition is obtained as shown in FIG. 3B, gain K11 or K12 is appropriately selected. In the inclined condition shown in FIG. 3C, i.e., when linear motor moving piece 42 is located above target position P, smaller gain K11 is selected. When linear motor moving piece 42 having passed target position P is located below target position P (i.e., moving piece 42 must be moved along the ascending slope toward target position P), larger gain K12 is selected. In fine, larger gain K12 is selected along the ascending slope, and smaller gain K11 is selected along the descending slope with respect to the moving direction of linear motor 12.

The thrust of linear motor 12, which is generated by the gravity component, can be corrected by gain selection control of this embodiment. In other words, gains are selected for the position deviation, the speed deviation, and the acceleration speed deviation, which correspond to the deviation levels and the present inclination angle level. Therefore, the weighting ratio of the position, the speed, and the acceleration speed can be variably controlled in accordance with the deviation conditions and the inclination condition so as to control the linear motor moving piece. Therefore, control operations, substantially free of disturbance such as vibrations and swinging, can be embodied.

If each of amplifiers 22, 23, and 24 arranged on the output sides of adders 17, 19, and 21 is constituted by three or more amplifiers, normal control for various inclination angles up to 30 degrees can be readily achieved.

According to this embodiment, the position, the speed, and the acceleration speed of linear motor 12 are controlled depending also on present inclination angle θ of the linear motor moving piece along the moving direction. Fine adjustment can be achieved to increase the access speed and can improve the control precision as compared with the control method depending only on the moving piece position, with the control method depending on the position and speed of the linear motor, or with the control method depending on the position, the speed, and the acceleration speed of the linear motor. Even if linear motor 12 is inclined with respect to the horizontal plane of the earth, control can be achieved to cause the moving piece to reach the target position.

An arrangement of a control apparatus for a linear motor according to the present invention will be described in detail with reference to FIGS. 5 to 14.

Figure 5:
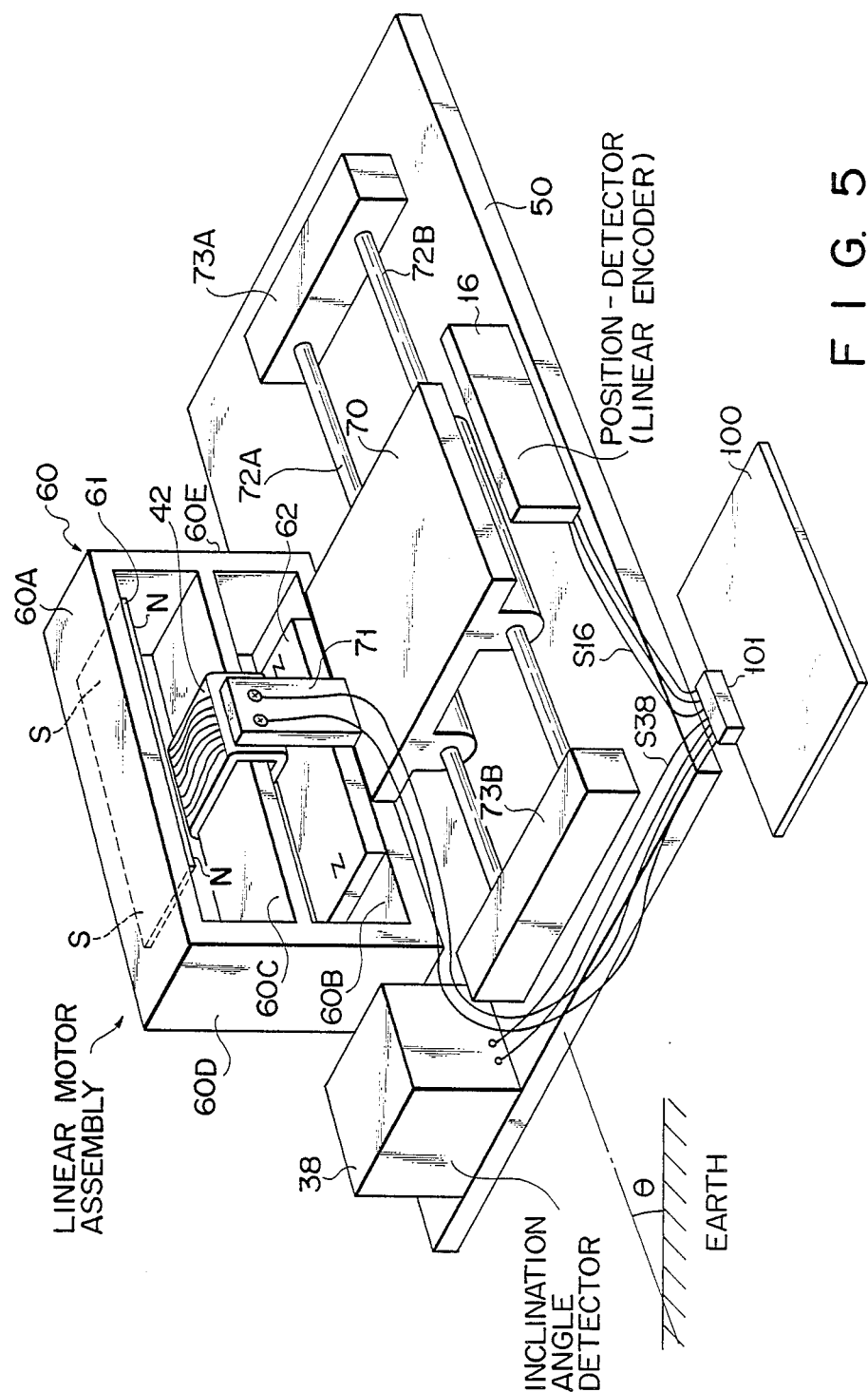
FIG. 5 is a perspective view showing a schematic arrangement of the linear motor shown in FIG. 1.

FIG. 5 is a perspective view showing a schematic arrangement (linear motor assembly) of the linear motor shown in FIG. 1. Referring to FIG. 5, linear motor magnetic circuit 60 is arranged on linear motor chassis 50. Magnetic circuit 60 has horizontal upper yoke 60A, horizontal lower yoke 60B, horizontal central yoke 60C, vertical left yoke 60D, and vertical right yoke 60E. The right and left ends of yokes 60A to 60C are shunted by yokes 60D and 60E. A magnetomotive force generated by yokes 60A to 60E in magnetic circuit 60 is obtained by two magnets 61 and 62 mounted on upper and lower yokes 60A and 60B.

Yoke 60C extends through the center of moving coil 42 serving as a moving piece in linear motor 12. When a current is supplied through coil 42, coil 42 is moved in a direction corresponding to the direction of the current. The current is supplied to coil 42 from driver circuit 11 (FIG. 1) mounted on circuit board 100.

Coil 42 is fixed on projection 71 formed at one side of moving base 70. Base 70 can be smoothly slided along two shafts 72A and 72B. Both ends of shafts 72A and 72B are fixed on chassis 50 by support members 73A and 73B. A mechanism (not shown) to be mechanically driven by the linear motor shown in FIG. 5 is fixed at a proper position on chassis 50.

Position detector (linear encoder) 16 is arranged at a position parallel to the slide direction of base 70. Inclination angle detector 38 is arranged near magnetic circuit 60 of the linear motor. Inclination angle detector 38 detects an inclination angle θ of coil 42 with respect to the horizontal plane of the earth. Signal lines of position detector 16 and inclination angle detector 38 are connected to circuit board 100 through connector 101.

Figure 6:
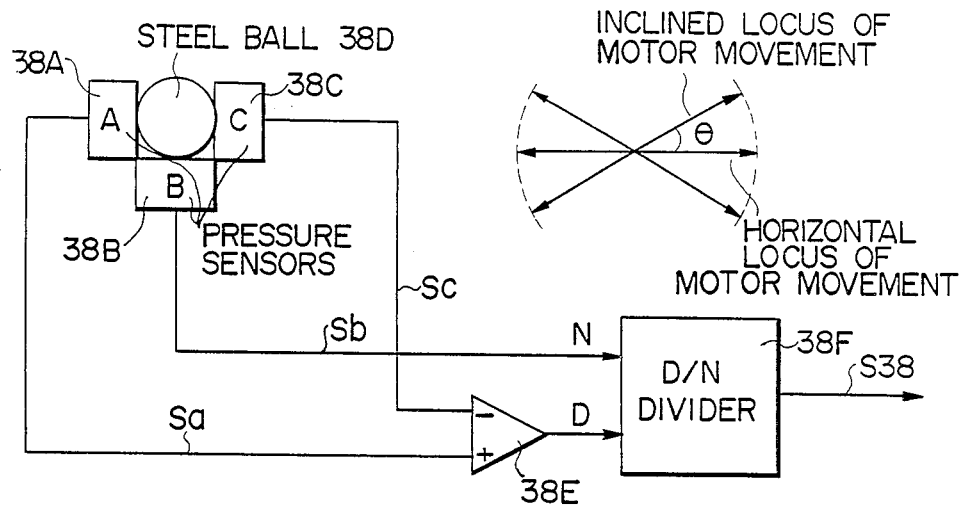
FIG. 6 is a view showing an internal arrangement of an inclination angle detector shown in FIG. 1.

An internal arrangement of inclination angle detector 38 (FIG. 5) is shown in FIG. 6. The weight of steel ball 38D acting on three pressure sensors 38A, 38B, and 38C is converted into an electric signal by detector 38. A typical pressure sensor of this type is disclosed in the following references:

(i) W. D. Hillis: The International Journal of Robotics Research, 1–2, 33 (1982)

(ii) J.M. Vranish: Proceedings of the 4th RoviSec, 269 (1984), and (iii) A.K. Bejczy: Robot Sensing and Controls, Tutorial Handout, 1985 IEEE International Conference on Robotics and Automation (1985).

(iv) J.H. Greenwood: The constraints on the Design and Use of Silicon-diaphragm Pressure Sensors, (1983) ERA Technologh LTD.

Output signal Sb from pressure sensor 38B is supplied to the N input of divider 38F. Output signals Sa and Sc from pressure sensors 38A and 38C are supplied to the noninverting and inverting inputs of differential amplifier 38E. Amplifier 38E serves as a noninverting amplifier for signal Sa and an inverting amplifier for signal Sb. An output signal from differential amplifier 38E is input to the D input of divider 38F. Divider 38F performs a division D/N and outputs inclination angle signal S38.

Figure 7:
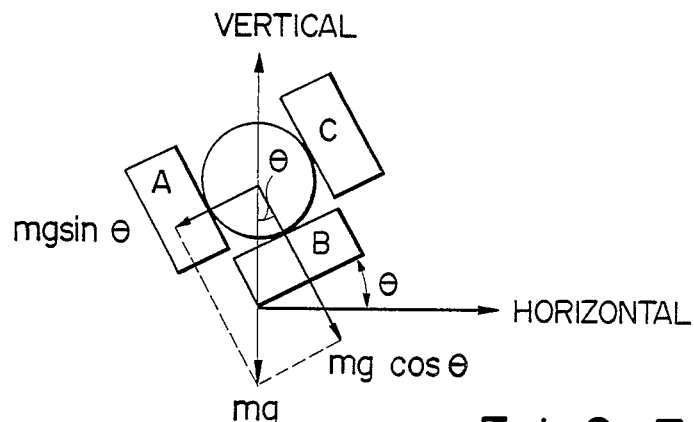
FIG. 7 is a view for explaining a reaction of pressure sensors in FIG. 6 against an inclination ($\theta$) of the linear motor.

FIG. 7 is a view for explaining reactions of pressure sensors 38A to 38C of FIG. 6 against inclination angle θ of linear motor 12. The abscissa of FIG. 7 is parallel to the horizontal plane of the earth, and the ordinate of FIG. 7 is perpendicular to the horizontal plane of the earth. A surface of pressure sensor 38B which receives steel ball 38D is inclined counterclockwise by angle θ with respect to the abscissa.

If the mass of steel ball 38D is defined as m and a gravity acceleration speed of the earth is defined as g, force mg acts downward along the ordinate of FIG. 7. In this case, pressure sensor 38A receives force mg·sinθ, and pressure sensor 38B receives force mg·cosθ. Pressure sensor 38C does not receive the weight of steel ball 38D.

If pressure sensor 38B is inclined clockwise by angle θ with respect to the abscissa of FIG. 7, pressure sensor 38C receives force −mg·sinθ, and pressure sensor 38B receives force mg·cosθ. In this case, pressure sensor 38A does not receive the weight of steel ball 38D.

Figure 8:
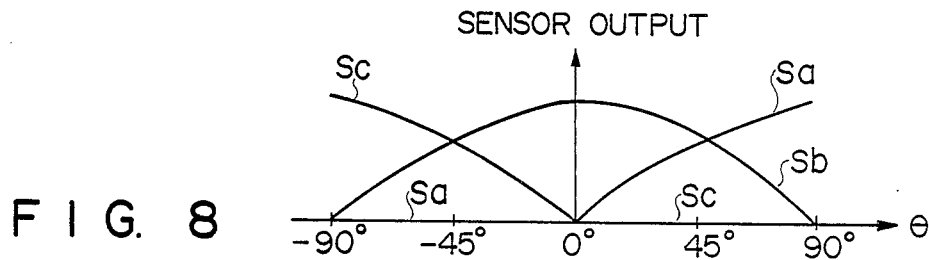
FIG. 8 is a graph for explaining the relationship between linear motor inclination angle $\theta$ and the levels of signals Sa, Sb, and Sc output from the three pressure sensors in FIG. 6.

FIG. 8 is a graph showing the relationship between inclination angle θ of linear motor 12 and levels of signals Sa, Sb, and Sc, output from pressure sensors 38A, 38B, and 38C. As shown in FIG. 8, electrical signals, Sa, Sb, and Sc, corresponding to inclination angle θ, can be obtained from pressure sensors 38A, 38B, and 38C.

Electrical signal Sa is converted into signal D (=Sa) by amplifier 38E. Electrical signal Sc is converted into signal D (=Sc) by amplifier 38E. When pressure sensor 38A has the same arrangement as that of pressure sensor 38C, the absolute value of signal Sa obtained when pressure sensor 38B is inclined counterclockwise by angle θ is equal to that of signal Sc obtained when pressure sensor 38B is inclined clockwise by angle θ.

Figure 9:
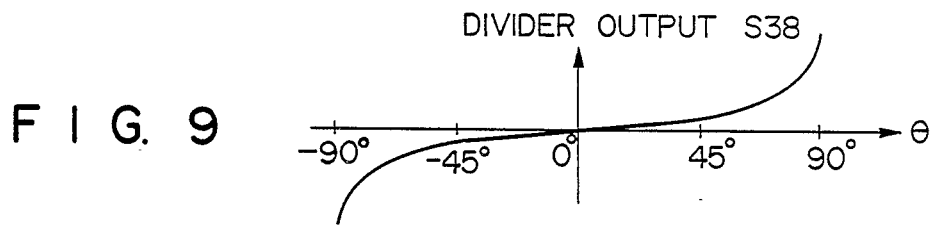
FIG. 9 is a graph showing the relationship between linear motor inclination angle $\theta$ and inclination angle signal S38 output from a divider shown in FIG. 6.

FIG. 9 is a graph showing the relationship between inclination angle signal S38 obtained from divider 38F and inclination angle θ of linear motor 12. When electrical signal Sa or Sc(=D) is divided by electrical signal Sb(=N), the signal characteristics in FIG. 8 are converted into those in FIG. 9. With the arrangement of FIG. 6, inclination angle signal S38 is obtained such that the signal level is zero for θ=0 and the level is proportionally changed for θ≠0.

FIG. 10 shows a detailed arrangement of condition control circuit 31 and decoder 32 in FIG. 1. Position deviation signal S17 is input to zero-crossing sensor 40. Zero-crossing sensor 40 has an input vs. output characteristic shown in FIG. 11. When signal S17 is positive, signal S40 of high level is output from sensor 40. When signal S17 is negative, signal S40 of low level is output from sensor 40 (if speed deviation signal S19 and acceleration speed deviation signal S21, in addition to position deviation signal S17, are input to sensor 40, the resultant circuit is equivalent to condition control circuit 31 in FIG. 1).

Inclination angle signal S38 is input to the noninverting input of comparator 411 and the inverting input of comparator 412. First comparison level L1 is applied to the inverting input of comparator 411, and second comparison level L2 is applied to the noninverting input of comparator 412.

Comparators 411 and 412 are operated as a window comparator and have an input vs. output characteristic shown in FIG. 12. When the level of signal S38 is higher than level L1 or lower than level L2, signal S41 (=S411 and S412) of high level is output from window comparator 411+412. When the level of signal S38 is lower than level L1 and higher than level L2, signal S41 (=S411 and S412) of low level is output from window comparator 411+412.

Output signal S411 from comparator 411 and output signal S412 from comparator 412 are supplied to the noninverting input of AND gate 391. Signal S411 is also supplied to the nonverting input of AND gate 393 and the inverting input of AND gate 395. Output signal S412 is input to the inverting inputs of AND gates 393 and 395.

An output from AND gate 391 serves as first output S32a of decoder 32 through switch 321 and second output S32b of decoder 32 through inverter 392 and switch 322. An output from AND gate 393 serves as first output S33a of decoder 33 through switch 323 and second output S33b of decoder 33 through inverter 394 and switch 324. An output from AND gate 395 serves as first output S34a of decoder 34 through switch 325 and second output S34b of decoder 34 through inverter 396 and switch 326.

When signal S17 is set at high level in response to the positive polarity of signal S40, switches 321, 323, and 325 are turned off and switches 322, 324, and 326 are turned on. When signal S17 is set at low level in response to the negative polarity of signal S40, switches 321, 323, and 325 are turned on and switches 322, 324, and 326 are turned off.

By the above operations, condition control circuit 31 and decoder 32 in FIG. 10 generate decoded outputs S32a, S32b, S33a, S33b, S34a, and S34b in accordance with the positive/negative polarities of signals S17, S19, and S21, and the level of signal S38. The relationship between the control gains and inclination angle conditions of linear motor 12, which allows generation of the above decoded outputs, is summarized in the following table.

| Inclination Condition | Deviation Condition | Position Control Gain | | Speed Control Gain | | Acceleration Speed Control Gain | |
|---|---|---|---|---|---|---|---|
| | | K11 | K12 | K21 | K22 | K31 | K32 |
| FIG. 3A | S17 > 0 | x | o | o | x | x | o |
| | S17 < 0 | o | x | x | o | o | x |
| FIG. 3B | S19 > 0 | x | o | x | o | x | o |
| | S19 < 0 | x | o | x | o | x | o |
| FIG. 3C | S21 > 0 | o | x | x | o | o | x |
| | S21 < 0 | x | o | o | x | x | o |

K11 < K12; K21 < K22; K31 < K32
o: selected; x: nonselected

FIGS. 13A to 13D correspond to the block diagram in FIG. 1 and are circuit diagrams showing the detailed arrangement of the control apparatus for a linear motor of another embodiment.

Figure 13A:
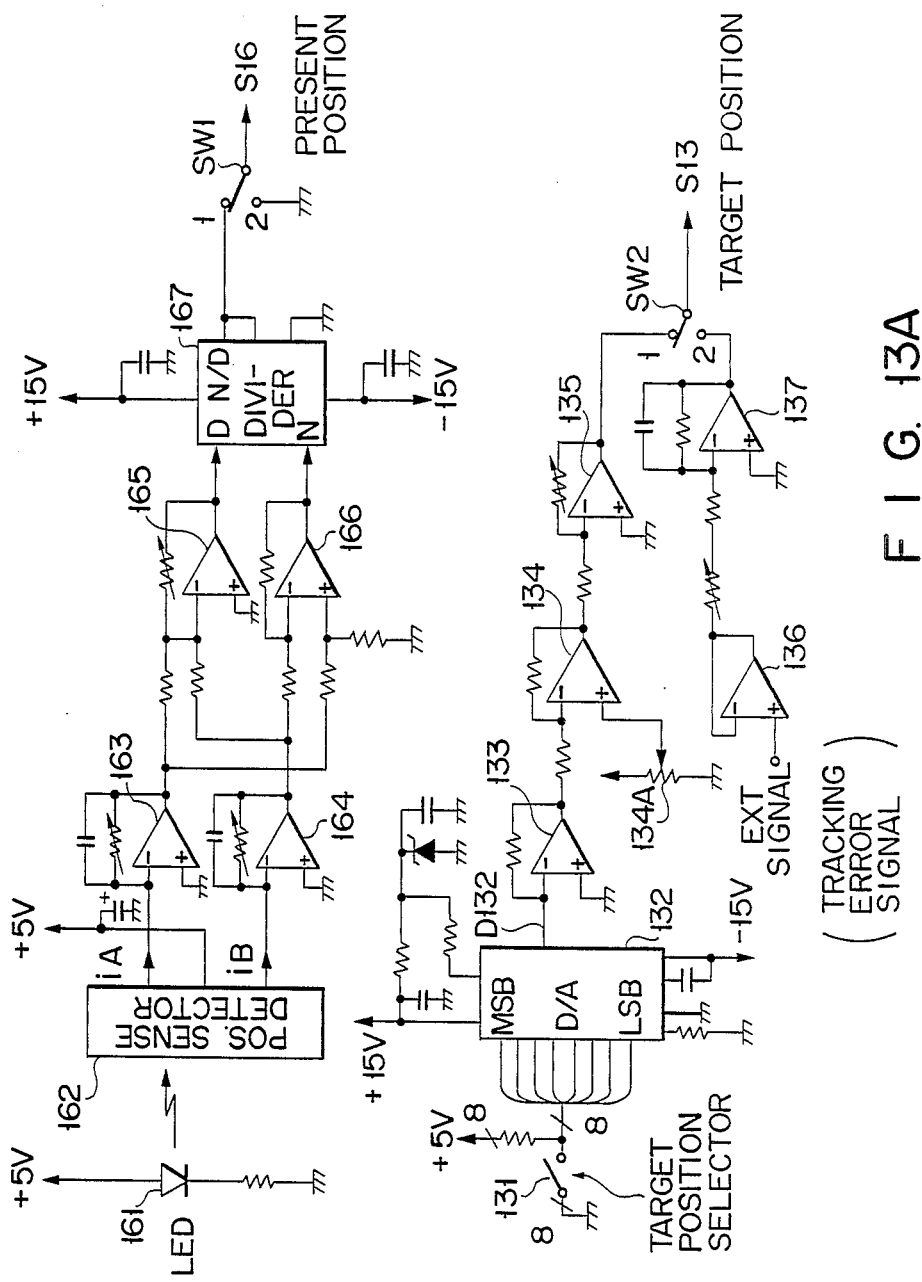
FIGS. 13A to 13D are circuit diagrams showing a control apparatus for a linear motor according to another embodiment of the present invention, which correspond to the block diagram of FIG. 1.

FIG. 13A shows a detailed arrangement of position detector 16. Light-emitting diode (LED) 161 is fixed on moving base 70 shown in FIG. 5 and is reciprocatively moved in the linear direction upon movement of moving piece 42 in linear motor 12. A beam from LED 161 is incident on a light-receiving surface of position sensitive detector (PSD) 162 of, e.g., a photodiode. PSD 162 (the PSD itself is a conventional electric element) outputs two current signals iA and iB which are changed in accordance with changes in position of the beam emitted from LED 161.

Current signal iA is supplied to the D input of divider 167 through current/voltage converter 163 and inverting amplifier 165. Current signal iA is also supplied to the N input of divider 167 through current/voltage converter 163 and the noninverting input of amplifier 166. Current signal iB is supplied to the D input of divider 167 through current/voltage converter 164 and inverting amplifier 165 and also to the N input of divider 167 through current/voltage converter 164 and the inverting input of amplifier 166.

Divider 167 performs a division N/D and outputs present position signal S16 of linear motor moving piece 42. The D input to divider 167 corresponds to the sum of current signals iA and iB. The N input to divider 167 corresponds to a difference between current signals iA and iB. Divider 167 performs a division (iA−iB)/(iA+iB).

Components (iA+iB) and (iA−iB) are changed depending on the relative positions of LED 161 and PSD 162 as well as the ambient light intensity or the amount of light emitted from LED 161. The change in (iA−iB) is equal to that in (iA+iB), and output signal S16 correspondings to (iA−iB)/(iA+iB), so that output from divider 167 is free of an error due to, for example, variations in amount of light emitted from LED 161.

Incidentally, when a position of moving piece 42 is to be deleted from control factors, switch SW1 is set in the contact 2 position.

FIG. 13A shows a detailed arrangement of target position setter 13. (An output from target speed setter 14 can be obtained by differentiating an output from target position setter 13 with respect to time, and an output from target acceleration speed setter 15 can be obtained by differentiating an output from target speed setter 14 with respect to time, which will be described later).

A target position of linear motor moving piece 42 is determined by specifying 8-bit target position data with switch 131. The 8-bit data is converted into analog target position current D132 by D/A converter 132. Current D132 is converted into target position signal S13, via current/voltage converter 133 and inverting amplifiers 134 to 135. A DC offset of signal S13 can be arbitrarily adjusted by variable resistor 134A.

In order to perform position control of moving piece 42 on the basis of a tracking error signal from a linear motor in a CD player, switches SW1 and SW2 are set in the contact 2 positions. An external signal such as a tracking error signal is supplied to the switch SW2 side through inverting amplifiers 136 and 137.

Figure 13B:
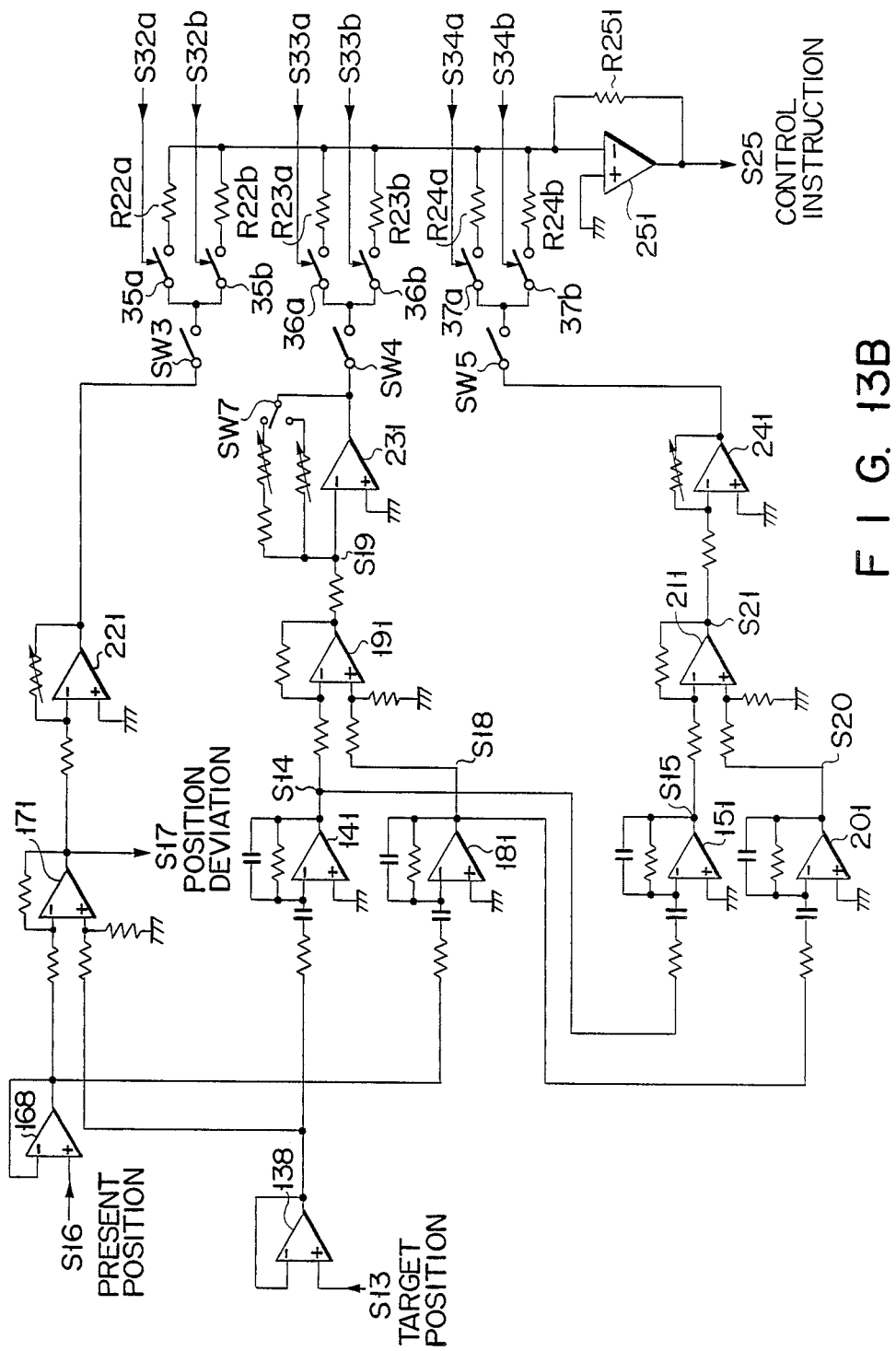

FIG. 13B shows a detailed arrangement of target speed setter 14, target acceleration speed setter 15, position deviation detector 17, speed deviation detector 19, acceleration speed deviation detector 21, variable amplifiers 22 to 24, and adder 25.

Present position signal S16 is supplied to the inverting input of amplifier 171 through buffer amplifier 168. Target position signal S13 is supplied to the noninverting input of amplifier 171 through buffer amplifier 138. Position deviation signal S17 proportional to a difference between signals S13 and S16 is output from amplifier 171.

Present position signal S16 from buffer amplifier 168 is converted into present speed signal S18 through inverting differentiation amplifier 181. Present speed signal S18 is converted into present acceleration speed signal S20 through inverting differentiation amplifier 201.

Target position signal S13 from buffer amplifier 138 is converted into target speed signal S14 through inverting differentiation amplifier 141. Target speed signal S14 is converted into target acceleration speed signal S15 through inverting differentiation amplifier 151.

Target speed signal S14 is supplied to the inverting input of amplifier 191, and present speed signal S18 is supplied to the noninverting input of amplifier 191. Speed deviation signal S19, proportional to a difference between signals S14 and S18, is output from amplifier 191. Target acceleration speed signal S15 is supplied to the inverting input of amplifier 211, and present acceleration speed signal S20 is supplied to the noninverting input of amplifier 211. Acceleration deviation selection S21, proportional to a difference between signals S15 and S20, is output from amplifier 211.

Position deviation signal S17 is connected to one terminal of each of switches 35a and 35b, via variable-gain/inverting amplifier 221 and switch SW3. Opening/closing of switches 35a and 35b is controlled by signals S32a and S32b from the circuit shown in FIG. 10. The other terminal of each of switches 35a and 35b is connected to the inverting input of amplifier 251, respectively via resistors R22a and R22b.

Speed deviation signal S19 is connected to one terminal of each of switches 36a and 36b, via variable-gain/inverting amplifier 231 and switch SW4. Opening/closing of switches 36a and 36b is controlled by signals S33a and S33b from the circuit shown in FIG. 10. The other terminal of each of switches 36a and 36b is connected to the inverting input of amplifier 251, respectively via resistors R23a and R23b. Two gains are preset in amplifier 231, and one of the preset gains can be selected by switch SW7.

Acceleration speed deviation signal S21 is connected to one terminal of each of switches 37a and 37b, via variable-gain/inverting amplifier 241 and switch SW5. Opening/closing of switches 37a and 37b is controlled by signals S34a and S34b from the circuit shown in FIG. 10. The other terminal of each of switches 37a and 37b is connected to the inverting input of amplifier 251, respectively via resistors R24a and R24b.

An output from amplifier 251 is connected to its inverting input through resistor R251, thereby constituting a gain-selectable amplifier. The gain of this amplifier (251) is selected in accordance with levels of signals S32a, S32b to S34a, and S34b. More specifically, when one of signals S32a to S34b is set at high level, the gain of the variable amplifier is determined by R251/R22a, R251/R22b, R251/R23a, R251/R23b, R251/R24a, or R251/R24b.

The gain-selectable amplifier (251) combines posiion deviation signal S17, speed deviation signal S19 and/or acceleration speed deviation signal S21, and outputs control instruction signal S25. For example, when switches SW3 and SW4 are ON, control instruction signal S25 corresponding to S17+S19 is output. When all switches SW3 to SW5 are ON, control instruction signal S25 corresponding to S17+S19+S21 is output. When only one of switches SW3 to SW5 is turned-on, control instruction signal S25 corresponding to the turned-on switch is output.

Weighting coefficients of position deviation signal 17, speed deviation signal S19, and acceleration speed deviation signal S21 can be optionally determined by adjusting gains of amplifiers 221, 231, and 241, respectively.

Figure 13C:
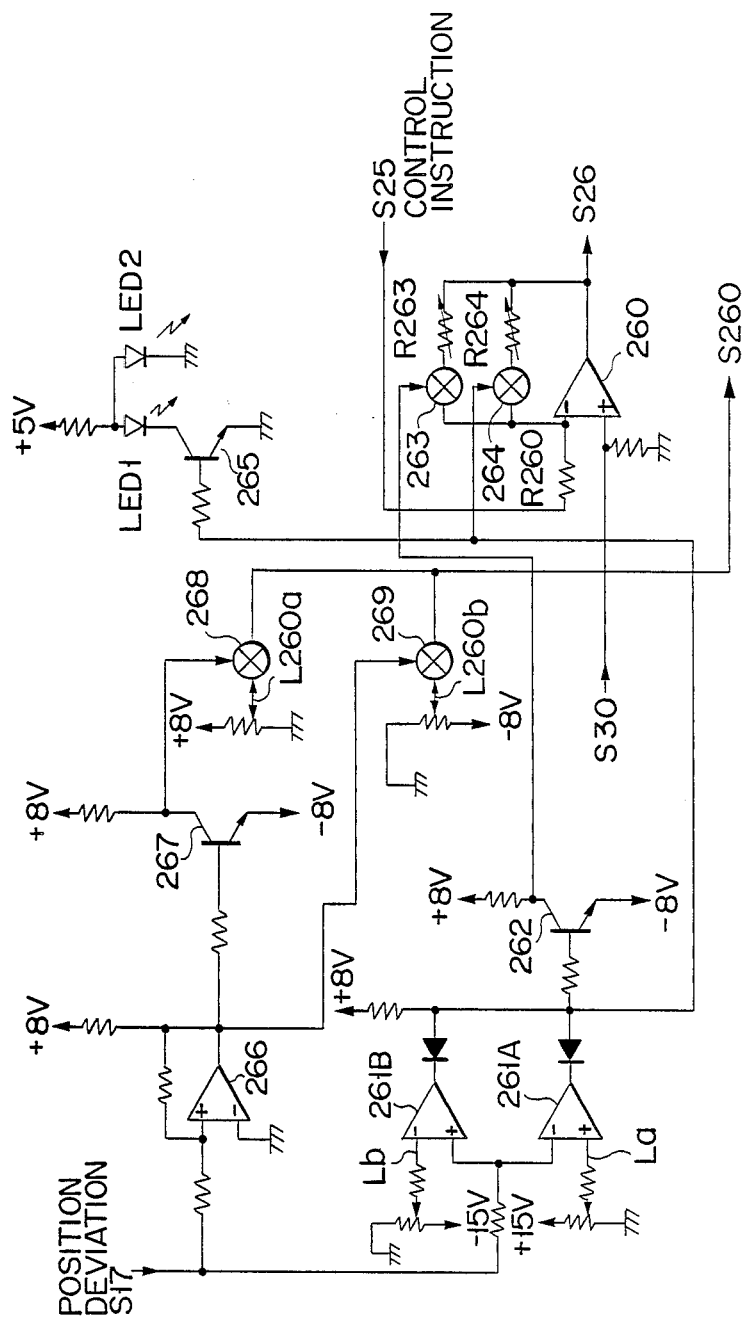
Figure 13D:
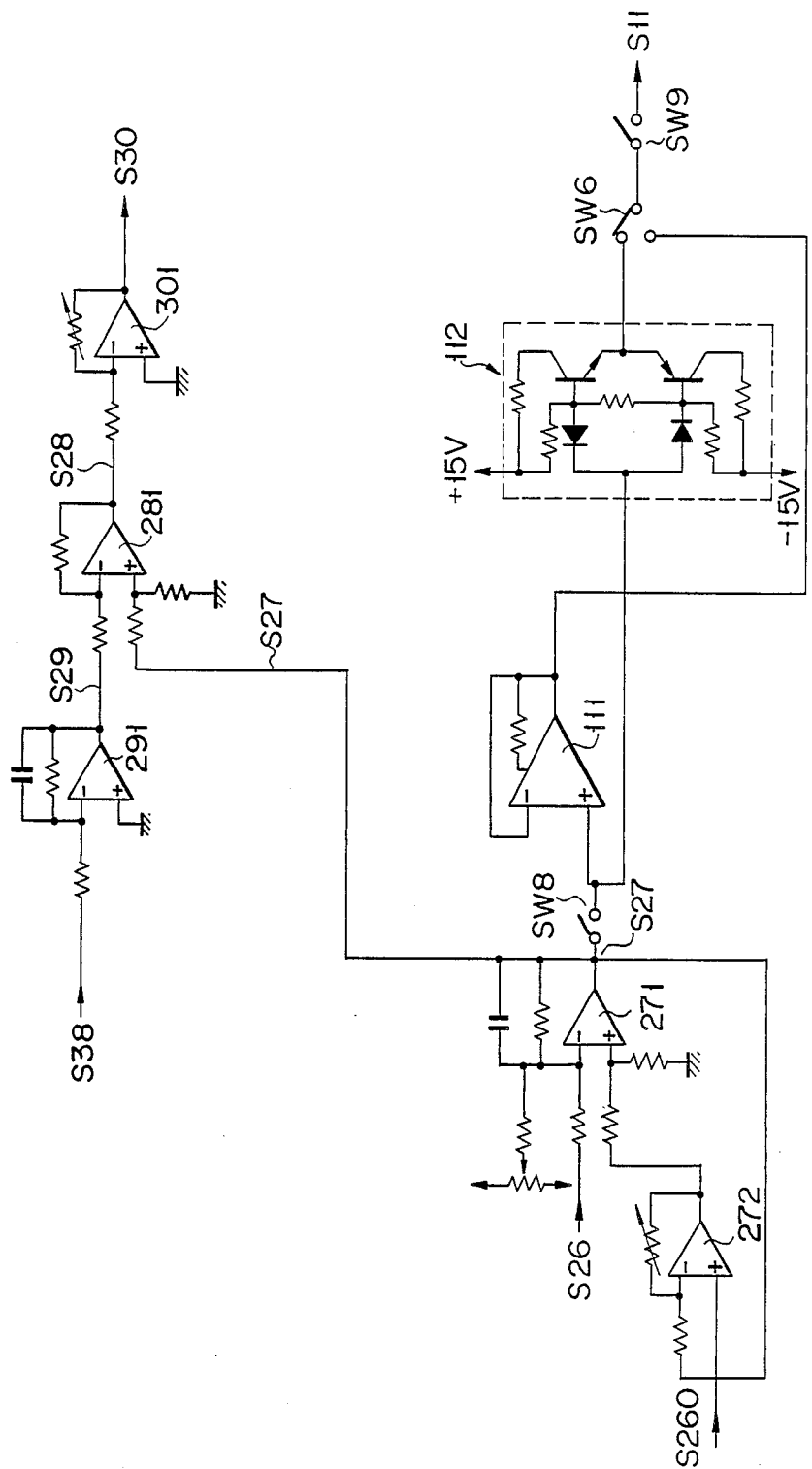

FIGS. 13C and 13D show an arrangement for generating drive signal S11 for linear motor 12 on the basis of control instruction signal S25 output from amplifier 251 shown in FIG. 13B.

Referring to FIG. 13C, control instruction signal S25 is supplied to the inverting input of amplifier 260 through resistor R260. An output from amplifier 260 is connected to its inverting input through resistor R263 or R264. A connection of resistor R263 or R264 to the inverting input is determined by the ON of analog switch 263 or 264 which are series-connected to resistors R263 and R264, respectively.

Bias signal S30 is applied to the noninverting input of amplifier 260. ON/OFF operation of analog switches 263 and 264 allows changes in gains (R260/R263 or R260/R264) of amplifier 260. Amplifier 260 amplifies a difference between signals S30 and S25 with its gain and outputs signal S26.

Position deviation signal S17 is input to comparators 261A and 261B having comparison levels La and Lb (La>Lb). These comparators constitutes a window comparator. Outputs from comparators 261A and 26B are used to turn on or off analog switch 263, via an inverter formed of npn transistor 262. ON/OFF control of analog switch 264 is directly performed by outputs from comparators 261A and 261B.

The ON condition of analog switch 263 or 264 is indicated by one of LEDs 1 and 2 which are alternately driven by npn transistor 265.

Position deviation signal S17 is supplied to the base of npn transistor 267 through comparator 266 having a hysteresis input characteristic. A collector output from transistor 267 is used to turn on or off analog switch 268. An output from comparator 266 is used to turn on or off analog switch 269.

When analog switch 268 is ON, positive offset bias L260a serves as offset signal S260. (In this case, analog switch 269 is OFF.) When analog switch 269 is ON, negative offset bias L260b serves as offset signal S260. (In this case, analog switch 268 is OFF.)

Referring to FIG. 13D, signal S26 is supplied to the inverting input of amplifier 271. Offset signal S260 is supplied to the noninverting input of amplifier 272. An output from amplifier 272 is supplied to the noninverting input of amplifier 271, and an output from amplifier 271 is fed back to the inverting input of amplifier 272.

Output signal S27 from amplifier 271 is supplied to the noninverting input of amplifier 281. Inclination angle signal S38 is supplied to the inverting input of amplifier 281 through inverting amplifier 291. Output S28 from amplifier 281 is converted to bias signal S30, via inverting amplifier 301, and fed back to the noninverting input of amplifier 260 in FIG. 13C.

Output signal S27 from amplifier 271 is supplied to motor drive amplifier 111 and complementary emitter follower 112 through switch SW8. Switch SW6 selects an output from amplifier 111 or emitter follower 112, and the selected output is supplied to moving coil 42 of linear motor 12 through switch SW9.

FIG. 14 shows a modification of the linear motor shown in FIG. 5, which exemplifies a motor whose moving coil 42 is moved along a locus having a predetermined curvature. Moving coil 42 is mounted at the distal end of rotary arm 120. Arcuated magnetic circuit 600 extends through the central portion of moving coil 42. The other end (proximal end) of arm 120 is fixed to rotating shaft 121. Rotary encoder 16 is connected to rotating shaft 121 to detect and angular position of arm 120. Rotating shaft 121 for arm 120 is fixed to a chassis (not shown) whose plane is parallel to a locus of moving coil 42. Inclination angle detector 38 is mounted on the chassis so as to be parallel to moving coil 42.

A member (not shown) to be driven by the motor having the above arrangement is mounted at the distal end of second rotary arm 122.

The arrangement shown in FIG. 14 is defined as one of the linear motors according to the present invention. The motor shown in FIG. 14 can be applied to a carrier mechanism of, for example, a laser diode head of a CD player or a magnetic head of a hard disk drive.

According to the present invention as desribed above in detail, the present position, the present speed, and/or the present acceleration speed as well as the inclination angle of the moving direction of the moving piece are taken into consideration to obtain target values including the position, the speed, and the acceleration speed. In this manner, the linear motor is controlled on the basis of the position, the speed, the acceleration speed, and the linear motor inclination condition.

As compared with a control method depending on only the position, with a control method depending on only the position and speed, and with a control method depending on the position, the speed and the acceleration speed, control errors due to a gravity component acting on the thrust of the linear motor can be far reduced to achieve high-precision control. Even if the linear motor is held inclined, the moving piece can be moved depending on appropriate target values so as to perform positioning with higher precision. The gains for removing deviations can be set depending on the deviation levels of the position, the speed, and the acceleration speed, as well as the present inclination angle level. Therefore, the weighting coefficients of the position, the speed, and the acceleration speed can be variably controlled on the basis of the deviation conditions and the inclination condition, to thereby minimize disturbance such as vibrations.

What is claimed is:

1. A control apparatus for a linear motor, comprising:
    linear motor means having a moving piece which is movable in response to a drive signal;
    position detecting means, coupled to said linear motor means, for generating a present position signal representing a present position of said moving piece;
    target position setting means for generating a target position signal representing a target position of said moving piece;
    position deviation detecting means, coupled to said position detecting means and to said target position setting means, for generating a position deviation signal representing a difference between the target position signal and the present position signal;
    inclination angle detecting means, coupled to said linear motor means, for generating an inclination angle signal representing an angle between a moving direction of said moving piece and a horizontal plane of the earth;
    control instruction means, coupled to said position deviation detecting means and to said inclination angle detecting means, for modifying the position deviation signal according to a characteristic corresponding to the inclination angle signal, and for generating a control instruction signal; and
    driving means, coupled to said control instruction means and to said linear motor means, for generating the drive signal corresponding to the control instruction signal, said driving means including:
    bias signal generating means, coupled to said inclination angle detecting means, for generating a bias signal corresponding to the inclination angle signal; and
    means for amplifying a sum of the control instruction signal and the bias signal, and outputting the drive signal.

2. A control apparatus for a linear motor, comprising:
    linear motor means having a moving piece which is movable in response to a drive signal;

position detecting means, coupled to said linear motor means, for generating a present position signal representing a present position of said moving piece;

target position setting means for generating a target position signal representing a target position of said moving piece;

position deviation detecting means, coupled to said position detecting means and to said target position setting means, for generating a position deviation signal representing a difference between the target position signal and the present position signal;

inclination angle detecting means, coupled to said linear motor means, for generating an inclination angle signal representing an angle between a moving direction of said moving piece and a horizontal plane of the earth; and control instruction means, coupled to said position deviation detecting means and to said inclination angle detecting means, for modifying the position deviation signal according to a characteristic corresponding to the inclination angle signal, and for generating a control instruction signal; and driving means, coupled to said control instruction means and to said linear motor means, for generating the drive signal corresponding to the control instruction signal;

said control instruction means including variable amplifying means for amplifying the position deviation signal with a gain depending on a magnitude of the inclination angle signal, and generating the control instruction signal.

3. A control apparatus for a linear motor, comprising:

linear motor means having a moving piece which is movable in response to a drive signal;

position detecting means, coupled to said linear motor means, for generating a present position signal representing a present position of said moving piece;

target position setting means for generating a target position signal representing a target position of said moving piece;

position deviation detecting means, coupled to said position detecting means and to said target position setting means, for generating a position deviation signal representing a difference between the target position signal and the present position signal;

inclination angle detecting means, coupled to said linear motor means, for generating an inclination angle signal representing an angle between a moving direction of said moving piece and a horizontal plane of the earth; and control instruction means, coupled to said position deviation detecting means and to said inclination angle detecting means, for modifying the position deviation signal according to a characteristic corresponding to the inclination angle signal, and for generating a control instruction signal; and driving means, coupled to said control instruction means and to said linear motor means, for generating the drive signal corresponding to the control instruction signal;

said control instruction means including variable amplifying means for amplifying the position deviation signal with a transfer function, depending on a sign of the position deviation signal and on a magnitude of the inclination angle signal, and generating the control instruction signal.

4. An apparatus according to claim 3, wherein the transfer function includes a plurality of functions, and said variable amplifying means includes selecting means for selecting one transfer function of the plurality of transfer functions when the magnitude of the inclination angle signal falls within a predetermined range, and for selecting another transfer function of the plurality of transfer functions when the magnitude of the inclination angle signal falls outside the predetermined range.

5. A control apparatus for a linear motor, comprising:

linear motor means having a moving piece which is movable in response to a drive signal;

position detecting means, coupled to said linear motor means, for generating a present position signal representing a present position of said moving piece;

target position setting means for generating a target position signal representing a target position of said moving piece;

position deviation detecting means, coupled to said position detecting means and to said target position setting means, for generating a position deviation signal representing a difference between the target position signal and the present position signal;

inclination angle detecting means, coupled to said linear motor means, for generating an inclination angle signal representing an angle between a moving direction of said moving piece and a horizontal plane of the earth; and control instruction means, coupled to said position deviation detecting means and to said inclination angle detecting means, for modifying the position deviation signal according to a characteristic corresponding to the inclination angle signal, and for generating a control instruction signal; and driving means, coupled to said control instruction means and to said linear motor means, for generating the drive signal corresponding to the conrol instruction signal;

said inclination angle detecting means including:

a weight having a predetermined mass;

first gravitational vector detecting means for detecting a first signal representing a first component of force $mg \cdot \cos\theta$, provided that a gravitational vector, generated by said weight and acting in a direction perpendicular to the earth, is defined as $mg$, and that the angle representing the inclination angle signal is defined as $\theta$;

second gravitational vector detecting means for detecting a second signal representing a second component of force $mg \cdot \sin\theta$ from the gravitational vector $mg$ and the angle $\theta$; and ratio means, coupled to said first gravitational vector detecting means and to said second gravitational vector detecting means, for generating the inclination angle signal from a ratio between the first signal and the second signal.

6. A control apparatus for a linear motor, comprising:

linear motor means having a moving piece which is movable in response to a drive signal;

position detecting means, coupled to said linear motor means, for generating a present position signal representing a present position of said moving piece;

target position setting means for generating a target position signal representing a target position of said moving piece;

position deviation detecting means, coupled to said position detecting means and to said target position setting means, for generating a position deviation signal representing a difference between the target position signal and the present position signal;

inclination angle detecting means, coupled to said linear motor means, for generating an inclination angle signal representing an angle between a moving direction of said moving piece and a horizontal plane of the earth; and control instruction means, coupled to said position deviation detecting means and to said inclination angle detecting means, for modifying the position deviation signal according to a characteristic corresponding to the inclination angle signal, and for generating a control instruction signal; and driving means, coupled to said control instruction means and to said linear motor means, for generating the drive signal corresponding to the control instruction signal;

said inclination angle detecting means including:

a weight having a predetermined mass;

first gravitational vector detecting means for detecting a first signal representing a first component of force $mg \cdot \cos\theta$, provided that a gravitational vector generated by said weight and acting in a direction perpendicular to the earth is defined as mg, and that the angle representing the inclination angle signal is defined as $\theta$;

second gravitational vector detecting means for detecting a second signal representing a second component of force $mg \cdot \sin\theta$ from the gravitational vector mg and the angle $\theta$;

third gravitational vector detecting means for detecting a third signal representing a third component of force $-mg \cdot \sin\theta$ from the gravitational vector mg and the angle $\theta$;

difference signal generating means, coupled to said first and third gravitational vector detecting means, for generating a difference signal representing a difference between the first and second signals; and ratio means, coupled to said first gravitational vector detecting means and to said difference signal generating means, for generating the inclination angle signal from a ratio between the first signal and the difference signal.

7. A control apparatus for a linear motor, comprising:

linear motor means having a moving piece which is movable in response to a drive signal;

position detecting means, coupled to said linear motor means, for generating a present position signal representing a present position of said moving piece;

target position setting means for generating a target position signal representing a target position of said moving piece;

position deviation detecting means, coupled to said position detecting means and to said target position setting means, for generating a position deviation signal representing a difference between the target position signal and the present position signal;

inclination angle detecting means, coupled to said linear motor means, for generating an inclination angle signal representing an angle between a moving direction of said moving piece and a horizontal plane of the earth;

control instruction means, coupled to said position deviation detecting means and to said inclination angle detecting means, for modifying the position deviation signal according to a characteristic corresponding to the inclination angle signal, and for generating a control instruction signal; and driving means, coupled to said control instruction means and to said linear motor means, for generating the drive signal corresponding to the control instruction signal;

speed detecting means, coupled to said linear motor means, for generating a present speed signal representing a present speed of said moving piece;

target speed setting means for generating a target speed signal representing a target speed of the moving piece; and speed deviation detecting means, coupled to said speed detecting means and to said target speed setting means, for generating a speed deviation signal representing a difference between the target speed signal and the present speed signal; and wherein said control instruction means modifies the speed deviation signal, according to a characteristic corresponding to the inclination angle signal, and generates the control instruction signal.

8. A control apparatus for a linear motor, comprising:

linear motor means having a moving piece which is movable in response to a drive signal;

position detecting means, coupled to said linear motor means, for generating a present position signal representing a present position of said moving piece;

target position setting means for generating a target position signal representing a target position of said moving piece;

position deviation detecting means, coupled to said position detecting means and to said target position setting means, for generating a position deviation signal representing a difference between the target position signal and the present position signal;

inclination angle detecting means, coupled to said linear motor means, for generating an inclination angle signal representing an angle between a moving direction of said moving piece and a horizontal plane of the earth;

control instruction means, coupled to said position deviation detecting means and to said inclination angle detecting means, for modifying the position deviation signal according to a characteristic corresponding to the inclination angle signal, and for generating a control instruction signal; and driving means, coupled to said control instruction means and to said linear motor means, for generating the drive signal corresponding to the control instruction signal;

acceleration speed detecting means, coupled to said linear motor means, for generating a present acceleration speed signal representing a present acceleration speed of said moving piece;

target acceleration speed setting means for generating a target acceleration speed signal representing a target acceleration speed of said moving piece; and acceleration speed deviation detecting means, coupled to said acceleration speed detecting means and to said target acceleration speed setting means, for generating an acceleration speed deviation signal representing a difference between the target acceleration speed signal and the present acceleration speed signal; and wherein said control instruction means modifies the acceleration speed deviation signal, according to a characteristic corresponding to the inclination angle signal, and generates the control instruction signal.

9. An apparatus according to claim 7, further comprising:

acceleration speed detecting means, coupled to said linear motor means, for generating a present acceleration speed signal representing a present acceleration speed of said moving piece;

target acceleration speed setting means for generating a target acceleration speed signal representing a target acceleration speed of said moving piece; and acceleration speed deviation detecting means, coupled to said acceleration speed detecting means and to said target acceleration speed setting means, for generating an acceleration speed deviation signal representing a difference between the target acceleration speed signal and the present acceleration speed signal; and wherein said control instruction means modifies the acceleration speed deviation signal according to a characteristic corresponding to the inclination angle signal and generates the control instruction signal.

10. A control apparatus for a linear motor, comprising:

linear motor means having a moving piece which is movable in response to a drive signal;

speed detecting means, coupled to said linear motor means, for generating a present speed signal representing a present speed of said moving piece;

target speed setting means for generating a target speed signal representing a target speed of said moving piece;

speed deviation detecting means, coupled to said speed detecting means and to said target speed setting means, for generating a speed deviation signal representing a difference between the target speed signal and the pesent speed signal;

inclination angle detecting means, coupled to said linear motor means, for generating an inclination angle signal representing an angle between a moving direction of said moving piece and a horizontal plane of the earth;

control instruction means, coupled to said speed deviation detecting means and to said inclination angle detecting means, for modifying the speed deviation signal according to a characteristic corresponding to the inclination angle signal, and for generating a control instruction signal; and driving means, coupled to said control instruction means and to said linear motor means, for generating the drive signal corresponding to the control instruction signal, said driving means including:

bias signal generating means, coupled to said inclination angle detecting means, for generating a bias signal corresponding to the inclination angle signal; and means for amplifying a sum of the control instruction signal and the bias signal, and outputting the drive signal.

11. A control apparatus for a linear motor, comprising:

linear motor means having a moving piece which is movable in response to a drive signal;

speed detecting means, coupled to said linear motor means, for generating a present speed signal representing a present speed of said moving piece;

target speed setting means for generating a target speed signal representing a target speed of said moving piece;

speed deviation detecting means, coupled to said speed detecting means and to said target speed setting means, for generating a speed deviation signal representing a difference between the target speed signal and the present speed signal;

inclination angle detecting means, coupled to said linear motor means, for generating an inclination angle signal representing an angle between a moving direction of said moving piece and a horizontal plane of the earth;

control instruction means, coupled to said speed deviation detecting means and to said inclination angle detecting means, for modifying the speed deviation signal according to a characteristic corresponding to the inclination angle signal, and for generating a control instruction signal; and driving means, coupled to said control instruction means and to said linear motor means, for generating the drive signal corresponding to the control instruction signal;

said control instruction means including variable amplifying means for amplifying the speed deviation signal with a gain depending on a magnitude of the inclination angle signal, and generating the control instruction signal.

12. A control apparatus for a linear motor, comprising:

linear motor means having a moving piece which is movable in response to a drive signal;

speed detecting means, coupled to said linear motor means, for generating a present speed signal representing a present speed of said moving piece;

target speed setting means for generating a target speed signal representing a target speed of said moving piece;

speed deviation detecting means, coupled to said speed detecting means and to said target speed setting means, for generating a speed deviation signal representing a difference between the target speed signal and the present speed signal;

inclination angle detecting means, coupled to said linear motor means, for generating an inclination angle signal representing an angle between a moving direction of said moving piece and a horizontal plane of the earth;

control instruction means, coupled to said speed deviation detecting means and to said inclination angle detecting means, for modifying the speed deviation signal according to a characteristic corresponding to the inclination angle signal, and for generating a control instruction signal; and driving means, coupled to said control instruction means and to said linear motor means, for generating the drive signal corresponding to the control instruction signal;

said control instruction means including variable amplifying means for amplifying the speed deviation signal with a transfer function, depending on a sign of the speed deviation signal and on a magnitude of the inclination angle signal, and generating the control instruction signal.

13. An apparatus according to claim 12, wherein the transfer function includes a plurality of functions, and said variable amplifying means includes selecting means for selecting one transfer function of the plurality of transfer functions when the magnitude of the inclination angle signal falls within a predetermined range, and for selecting another transfer function of the plurality of transfer functions when the magnitude of the inclination angle signal falls outside the predetermined range.

14. A control apparatus for a linear motor, comprising:

linear motor means having a moving piece which is movable in response to a drive signal;

speed detecting means, coupled to said linear motor means, for generating a present speed signal representing a present speed of said moving piece;

target speed setting means for generating a target speed signal representing a target speed of said moving piece;

speed deviation detecting means, coupled to said speed detecting means and to said target speed setting means, for generating a speed deviation signal representing a difference between the target speed signal and the present speed signal;

inclination angle detecting means, coupled to said linear motor means, for generating an inclination angle signal representing an angle between a moving direction of said moving piece and a horizontal plane of the earth;

control instruction means, coupled to said speed deviation detecting means and to said inclination angle detecting means, for modifying the speed deviation signal according to a characteristic corresponding to the inclination angle signal, and for generating a control instruction signal; and driving means, coupled to said control instruction means and to said linear motor means, for generating the drive signal corresponding to the control instruction signal;

said inclination angle detecting means including:

a weight having a predetermined mass;

first gravitational vector detecting means for detecting a first signal representing a first component of force $mg \cdot \cos\theta$, provided that a gravitational vector generated by said weight and acting in a direction perpendicular to the erth is defined as mg, and that the angle representing the inclination angle signal is defined as $\theta$;

second gravitational vector detecting means for detecting a second signal representing a second component of force $mg \cdot \sin\theta$ from the gravitational vector mg and the angle $\theta$; and ratio means, coupled to said first gravitational vector detecting means to said second gravitational vector detecting means, for generating the inclination angle signal from a ratio between the first signal and the second signal.

15. A control apparatus for a linear motor, comprising:

linear motor means having a moving piece which is movable in response to a drive signal;

speed detecting means, coupled to said linear motor means, for generating a present speed signal representing a present speed of said moving piece;

target speed setting means for generating a target speed signal representing a target speed of said moving piece;

speed deviation detecting means, coupled to said speed detecting means and to said target speed setting means, for generating a speed deviation signal representing a difference between the target speed signal and the present speed signal;

inclination angle detecting means, coupled to said linear motor means, for generating an inclination angle signal representing an angle between a moving direction of said moving piece and a horizontal plane of the earth;

control instruction means, coupled to said speed deviation detecting means and to said inclination angle detecting means, for modifying the speed deviation signal according to a characteristic corresponding to the inclination angle signal, and for generating a control instruction signal; and driving means, coupled to said control instruction means and to said linear motor means, for generating the drive signal corresponding to the control instruction signal;

said inclination angle detecting means including:

a weight having a predetermined mass;

first gravitational vector detecting means for detecting a first signal representing a first component of force $mg \cdot \cos\theta$, provided that a gravitational vector generated by said weight and acting in a direction perpendicular to the earth is defined as mg, and that the angle representing the inclination angle signal is defined as $\theta$;

second gravitational vector detecting means for detecting a second signal representing a second component of force $mg \cdot \sin\theta$ from the gravitational vector mg and the angle $\theta$;

third gravitational vector detecting means for detecting a third signal representing a third component for force $-mg \cdot \sin\theta$ from the gravitation vector mg and the angle $\theta$;

difference signal generating means, coupled to said first and third gravitational vector detecting means for generating a difference signal representing a difference between the first and second signals; and ratio means, coupled to said first gravitational vector detecting means and to said difference signal generating means, for generating the inclination angle signal from a ratio between the first signal and the difference signal.

16. A control apparatus for a linear motor, comprising:

linear motor means having a moving piece which is movable in response to a drive signal;

speed detecting means, coupled to said linear motor means, for generating a present speed signal representing a present speed of said moving piece;

target speed setting means for generating a target speed signal representing a target speed of said moving piece;

speed deviation detecting means, coupled to said speed detecting means and to said target speed setting means, for generating a speed deviation signal representing a difference between the target speed signal and the present speed signal;

inclination angle detecting means, coupled to said linear motor means, for generating an inclination angle signal representing an angle between a moving direction of said moving piece and a horizontal plane of the earth;

control instruction means, coupled to said speed deviation detecting means and to said inclination angle detecting means, for modifying the speed deviation signal according to a characteristic corresponding to the inclination angle signal, and for generating a control instruction signal; and driving means, coupled to said control instruction means and to said linear motor means, for generating the drive signal corresponding to the control instruction signal;

acceleration speed detecting means, coupled to said linear motor means, for generating a present acceleration speed signal representing a present acceleratin speed of said moving piece;

target acceleration speed setting means for generating a target acceleration speed signal representing a target acceleration speed of said moving piece; and acceleration speed deviation detecting means, coupled to said acceleration speed detecting means and to said target acceleration speed setting means, for generating an acceleration speed deviation signal representing a difference between the target acceleration speed signal and the present acceleration speed signal; and wherein said control instruction means modifies the acceleration speed deviation signal, according to the characteristics corresponding to the inclination angle signal, and generates the control instruction signal.

17. A control apparatus for a linear motor, comprising:

linear motor means having a moving piece which is movable in response to a drive signal;

acceleration speed detecting means, coupled to said linear motor means, for generating a present acceleration speed signal representing a present acceleration speed of said moving piece;

target acceleration speed setting means for generating a target acceleration speed signal representing a target acceleration speed of said moving piece;

acceleration speed deviation detecting means, coupled to said acceleration speed detecting means and to said target acceleration speed setting means, for generating an acceleration speed deviation signal representing a difference between the target acceleration speed signal and the present acceleration speed signal;

inclination angle detecting means, coupled to said linear motor means, for generating an inclination angle signal representing an angle between a moving direction of said moving piece and a horizontal plane of the earth;

control instruction means, coupled to said acceleration speed deviation detecting means and to said inclination angle detecting means, for modifying the acceleration speed deviation signal according to a characteristic corresponding to the inclination angle signal, and for generating a control instruction signal; and driving means, coupled to said control instruction means and to said linear motor means, for generating the drive signal corresponding to the control instruction signal.

18. An apparatus according to claim 17, wherein said driving means includes:

bias signal generating means, coupled to said inclination angle detecting means, for generating a bias signal corresponding to the inclination angle signal; and means for amplifying a sum of the control instruction signal and the bias signal, and for outputting the drive signal.

19. An apparatus according to claim 17, wherein said control instruction means includes variable amplifying means for amplifying the acceleration speed deviation signal with a gain, depending on a magnitude of the inclination angle signal, and generating the control instruction signal.

20. An apparatus according to claim 17, wherein said control instruction means includes variable amplifying means for amplifying the acceleration speed deviation signal with a transfer function, depending on a sign of the acceleration speed deviation signal and on a magnitude of the inclination angle signal, and generating the control instruction signal.

21. An apparatus according to claim 20, wherein the transfer function includes a plurality of functions, and said variable amplifying means includes selecting means for selecting one transfer function of the plurality of transfer functions when the magnitude of the inclination angle signal falls within a predetermined range, and for selecting another transfer function of the plurality of transfer functions when the magnitude of the inclination angle signal falls outside the predetermined range.

22. An apparatus according to claim 17, wherein said inclination angle detecting means includes:

a weight having a predetermined mass;

first gravitational vector detecting means for detecting a first signal representing a first component of force mg·cos$\theta$, provided that a gravitational vector generated by said weight and acting in a direction perpendicular to the earth is defined as mg, and that the angle representing the inclination angle signal is defined as $\theta$;

second gravitational vector detecting means for detecting a second signal representing a second component of force mg·sin$\theta$ from the gravitational vector mg and the angle $\theta$; and ratio means, coupled to said first gravitational vector detecting means and to said second gravitational vector detecting means, for generating the inclination angle signal from a ratio between the first signal and the second signal.

23. An apparatus according to claim 17, wherein said inclination angle detecting means includes:

a weight having a predetermined mass;

first gravitational vector detecting means for detecting a first signal representing a first component of force mg·cos$\theta$, provided that a gravitational vector generated by said weight and acting in a direction prependicular to the earth is defined as mg, and that the angle representing the inclination angle signal is defined as $\theta$;

second gravitational vector detecting means for detecting a second signal representing a second component of force $-$mg·sin$\theta$ from the gravitational vector mg and the angle $\theta$;

third gravitational vector detecting means for detecting a third signal representing a third component of force $-$mg·sin$\theta$ from the gravitational vector mg and the angle $\theta$;

difference signal generating means, coupled to said first and third gravitational vector detecting means, for generating a difference signal representing a difference between the first and second signals; and ratio means, coupled to said first gravitational vector detecting means to said difference signal generating means, for generating the inclination angle signal from a ratio between the first signal and the difference signal.

24. A control apparatus for a linear motor, comprising:

linear motor means having a moving piece which is movable in response to a drive signal;

position detecting means, coupled to said linear motor means, for generating a present position signal representing a present position of said moving piece;

target position setting means for generating a target position signal representing a target position of said moving piece;

position deviation detecting means, coupled to said position detecting means and to said target position setting means, for generating a position deviation signal representing a difference between the target position signal and the present position signal;

speed detecting means, coupled to said linear motor means, for generating a present speed signal representing a present speed of said moving piece;

target speed setting means for generating a target speed signal representing a target speed of said moving piece;

speed deviation detecting means, coupled to said speed detecting means and to said target speed setting means, for generating a speed deviation signal representing a difference between the target speed signal and the present speed signal;

acceleration speed detecting means, coupled to said linear motor means, for generating a present acceleration speed signal representing a present acceleration speed of said moving piece;

target acceleration speed setting means for generating a target acceleration speed signal representing a target acceleration speed of said moving piece;

acceleration speed deviation detecting means, coupled to said acceleration speed detecting means and to said target acceleration speed setting means, for generating an acceleration speed deviation signal representing a difference between the target acceleration speed signal and the present acceleration speed signal;

inclination angle detecting means, coupled to said linear motor means, for generating an inclination angle signal representing an angle between a moving direction of said moving piece and a horizontal plane of the earth;

position deviation signal modifying means, coupled to said position deviation detecting means and to said inclination angle detecting means, for modifying the position deviation signal with a first weighting characteristic corresponding to the inclination angle signal, and generating a modified position deviation signal;

speed deviation signal modifying means, coupled to said speed deviation detecting means and to said inclination angle detecting means, for modifying the speed deviation signal with a second weighting characteristic corresponding to the inclination angle signal, and generating a modified speed deviation signal;

acceleration speed deviation signal modifying means, coupled to said acceleration speed deviation detecting means and to said inclination angle detecting means, for modifying the acceleration speed deviation signal with a third weighting characteristic corresponding to the inclination angle signal, and generating a modified acceleration speed deviation signal;

control instruction generating means, coupled to said position deviation signal modifying means, to said speed deviation signal modifying means, and to said acceleration speed deviation signal modifying means, for generating a control instruction signal corresponding to a sum of the modified position deviation signal, the modified speed deviation signal, and the modified acceleration speed deviation signal; and driving means, coupled to said control instruction generating means and to said linear motor means, for generating the drive signal corresponding to the control instruction signal.

25. An apparatus according to claim 24, wherein said driving means includes:

first means, coupled to said linear motor means, for amplifying a predetermined first signal to provide the drive signal;

second means, coupled to said inclination angle detecting means, for generating a second signal obtained by weighting the inclination angle signal with a first weighting coefficient;

third means, coupled to said first and second means, for generating a third signal obtained by weighting a difference between the first and second signals with a second weighting coefficient; and fourth means, coupled to said third means and to said control instruction generating means, for weighting a sum of the third signal and the control instruction signal with a third weighting coefficient to generate the first signal.

26. A control apparatus for a linear motor, comprising:

linear motor means having a moving piece which is movable in response to a drive signal;

position detecting means, coupled to said linear motor means, for generating a present position signal representing a present position of said moving piece;

target position setting means for generating a target position signal representing a target position of said moving piece;

position deviation detecting means, coupled to said position detecting means and to said target position setting means, for generating a position deviation signal representing a difference between the target position signal and the present position signal;

inclination angle detecting means, coupled to said linear motor means, for generating an inclination angle signal representing an angle between a moving direction of said moving piece and a horizontal plane of the earth; and control instruction means, coupled to said position deviation detecting means and to said inclination angle detecting means, for modifying the position deviation signal according to a characteristic corresponding to the inclination angle signal, and for generating a control instruction signal; and driving means, coupled to said control instruction means and to said linear motor means, for generating the drive signal corresponding to the control instruction signal;

said driving means including:
- first means, coupled to said linear motor means, for amplifying a predetermined first signal to provide the drive signal;
- second means, coupled to said inclination angle detecting means, for generating a second signal obtained by weighting the inclination angle signal with a first weighing coefficient;
- third means, coupled to said first and second means, for generating a third signal obtained by weighing a difference between the first and second signals with a second weighing coefficient; and
- fourth means, coupled to said third means and to said control instruction generating means, for weighing a sum of the third signal and the control instruction signal with a third weighing coefficient to generate the first signal.

27. A control apparatus for a linear motor, comprising:
- linear motor means having a moving piece which is movable in response to a drive signal;
- speed detecting means, coupled to said linear motor means, for generating a present speed signal representing a present speed of said moving piece;
- target speed setting means for generating a target speed signal representing a target speed of said moving piece;
- speed deviation detecting means, coupled to said speed detecting means and to said target speed setting means, for generating a speed deviation signal representing a difference between the target speed signal and the pesent speed signal;
- inclination angle detecting means, coupled to said linear motor means, for generating an inclination angle signal representing an angle between a moving direction of said moving piece and a horizontal plane of the earth;
- control instruction means, coupled to said speed deviation detecting means and to said inclination angle detecting means, for modifying the speed deviation signal according to a characteristic corresponding to the inclination angle signal, and for generating a control instruction signal; and
- driving means, coupled to said control instruction means and to said linear motor means, for generating the drive signal corresponding to the control instruction signal;

said driving means including:
- first means, coupled to said linear motor means, for amplifying a predetermined first signal to provide the drive signal;
- second means, coupled to said inclination angle detecting means, for generating a second signal obtained by weighing the inclination angle signal with a first weighing coefficient;
- third means, coupled to said first and second means, for generating a third signal obtained by weighing a difference between the first and second signals with a second weighing coefficient; and
- fourth means, coupled to said third means and to said control instruction generating means, for weighing a sum of the third signal and the control instruction signal with a third weighing coefficient to generate the first signal.

28. An apparatus according to claim 17, wherein said driving means includes:
- first means, coupled to said linear motor means, for amplifying a predetermined first signal to provide the drive signal;
- second means, coupled to said inclination angle detecting means, for generating a second signal obtained by weighting the inclination angle signal with a first weighting coefficient;
- third means, coupled to said first and second means, for generating a third signal obtained by weighting a difference between the first and second signals with a second weighting coefficient; and
- fourth means, coupled to said third means and to said control instruction generating means, for weighting a sum of the third signal and the control instruction signal with a third weighting coefficient to generate the first signal.

* * * * *